United States Patent Office 3,501,456
Patented Mar. 17, 1970

3,501,456
ARABINOFURANOSYL NUCLEOSIDES
AND INTERMEDIATES
Tsung-Ying Shen, Westfield, and Thomas Neilson and William V. Ruyle, Scotch Plains, N.J., assignors to Merck & Co., Inc., Rahway, N.J., a corporation of New Jersey
No Drawing. Filed Aug. 8, 1967, Ser. No. 659,045
Int. Cl. C07c *47/18, 95/04*
U.S. Cl. 260—211.5                           11 Claims

ABSTRACT OF THE DISCLOSURE (5-amino-5-deoxyarabinofuranosyl)purines and pyrimidines are prepared by reacting a blocked 5-amino-5-deoxyarabinofuranosyl halide with the appropriate purine or pyrimidine compound. The 5-amino-5-deoxyarabinofuranosyl halide intermediate is prepared by reacting the known methyl 5-deoxy-5-tritylarabinofuranoside with benzyl chloride to obtain the 2,3-di-O-benzyl derivative, and then removing the 5-trityl-group to give methyl 2,3-di-O-benzylarabinofuranoside. The latter compound is then treated with mesyl chloride to obtain the 5-mesyl-derivative, which is treated with potassium phthalimide to produce methyl 2,3-di-O-benzyl-5-deoxy-5-phthalimido-arabinofuranoside. The latter compound is then converted to the 2,3-di-O-benzyl-5-deoxy-5-phthalimidoarabinofuranosyl halide by treatment with hydrogen halide in glacial acetic acid.

The (5-amino-5-deoxyarabinofuranosyl)purines and pyrimidines have antiviral activity, and are useful as nucleoside antimetabolites, and as nucleic acid biosynthesis inhibitors.

---

This invention relates to novel arabinofuranosyl nucleosides. More particularly, this invention relates to (5-amino-5-deoxyarabinofuranosyl)purines and pyrimidines, and to the 5-amino-5-deoxyarabinofuranosyl halide intermediates used for the preparation of these nucleosides, as well as to processes of preparing the intermediates.

The novel compounds of this invention are the α and β anomers of the nucleosides represented by Formulas A and B, and of the intermediates represented by Formula C.

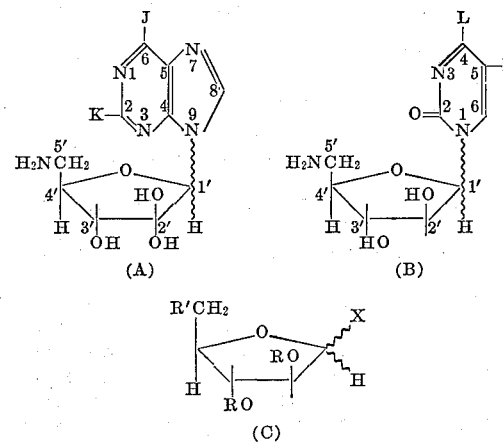

wherein:

J and K may be the same or different, hydrogen, halogen, hydroxy, mercapto, lower-alkylmercapto, amino, alkenylamino, lower alkyl substituted amino, lower acylamino, or aralkylmercapto, or aralkylamino;
L is lower alkoxy, hydroxy, amino, or alkyl substituted amino; and
M is hydrogen, lower alkyl, halogen, halogenated-lower-alkyl, amino, alkyl substituted amino, mercapto or alkyl mercapto;
R is benzyl or (substituted-phenyl)methyl;
R' is phthalimido; and
X is chloro or bromo.

The compounds of the present invention have demonstrated a variety of valuable utilities. They have antiviral activity. They are capable of inhibiting ribonucleic acid (RNA) synthesis, for example, acid insoluble RNA synthesis, in Ehrlich ascites cells and KB cells. In in vitro tests, the growth of KB cells is markedly suppressed as is the incorporation of hypoxanthine into acid insoluble RNA. The compounds are therefore useful as antimetabolites as cell growth inhibitors and for the study of metabolism systems. They also demonstrate favorable cytotoxicity characteristics considered with their cell growth depression. In addition, they show a marked resistance to the action of adenosine deaminase, which means that such compounds can be expected to stay longer in the animal body so that their activity can be biologically useful.

The nucleosides may also be converted to nucleotides by treatment with phosphoric acid derivatives in accordance with known techniques. As such, they are useful in a formulation of media for selective culturing of animal tissue cells. These nucleotides may also be useful in the study of nucleic acid metabolism.

The novel intermediates (C) are useful in preparing purine nucleosides (A) and pyrimidine nucleosides (B) which have the above-described biological properties.

The novel 5-amino-5-deoxyarabinofuranosyl halide intermediates (C) used for preparing the novel nucleosides of this invention are represented by the formula:

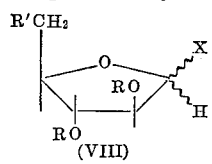

wherein:

R is an aralkyl group, either substituted or unsubstituted, such as benzyl, alkylbenzyl, alkoxybenzyl, halobenzyl or nitrobenzyl;
R' is phthalimido; and
X is chloro or bromo.

These intermediates are prepared according to the procedure shown in Flow Sheet I.

Flow Sheet I

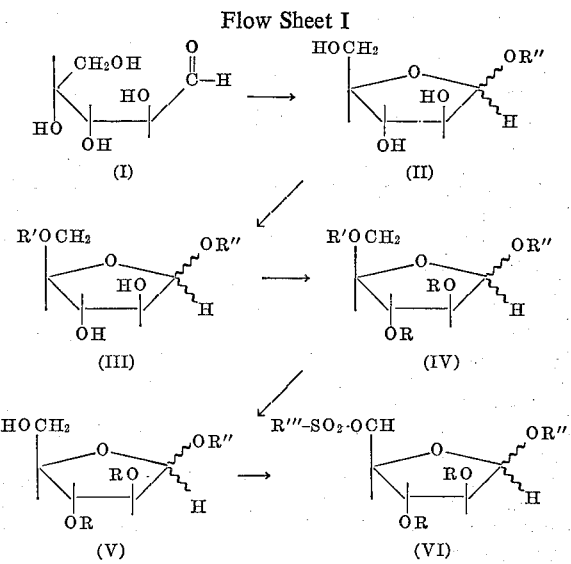

Flow sheet I—Continued

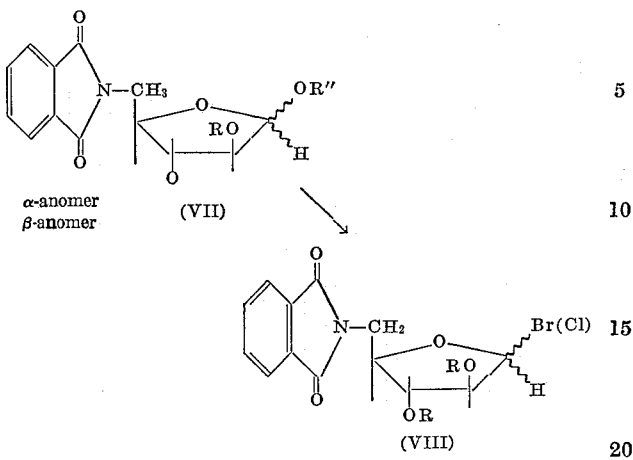

where R is aralkyl, R″ is lower alkyl and R‴ is methyl, phenyl or tolyl.

According to this process D-arabinose (I) is converted into an alkyl D-arabinoside (II) in a conventional manner, suitably by treating an anhydrous solution of an alkanol with sulfuric acid in the presence of a dehydrating agent. This reaction takes place in approximately 100% yields, for example, by adding concentrated sulfuric acid to a solution of the D-arabinose in an alkanoly at an elevated temperature, within the range of 25–60° C., for several hours.

The alkyl D-arabinoside is then reacted with triphenylchloromethane in the presence of an organic base in an inert solvent to obtain the alkyl 5-deoxy-5-trityl-arabinofuranoside (III). Room temperature up to about 100° C. may be used, the time required being several days at the lower temperature. However, better selectivity of tritylation at the 5-position is obtained at a lower temperature. The proportion of ingredients is approximately stoichiometric, using 0.9 to 1.2 moles of triphenylchloromethane for 1 mole of the arabinofuranoside.

The alkyl 5-deoxy-5-tritylarabinofuranoside is converted to the 2,3-di-O-benzyl derivative (IV) by treating with benzyl halide in the presence of a strong base in an anhydrous inert solvent at an elevated temperature for several hours. The solvent used can be an aromatic hydrocarbon such as benzene, toluene, or xylene; an ether such as 1,2-dimethoxyethane, tetrahydrofuran or diethyl ether; or dioxane. A strong base such as potassium hydroxide, sodium hydroxide, sodium hydride or caustic potash is used. The temperature may vary from ambient temperatures up to about 150° C., but the reaction is run preferably at the reflux temperature of the solvent employed.

The trityl group is then removed from the alkyl 2,3-di-O-benzyl-5-trityl-5-deoxyarabinoside to give the alkyl 2,3-di - O - benzylarabinofuranoside (V). This reaction is brought about by dissolving the compound in an aqueous solution of an organic acid, such as formic or acetic acid. A weak organic acid is used in a concentration such that cleavage of the alkoxy or benzyl groups is avoided.

The product is then treated with an alkyl or aryl sulfonyl halide such as benzenesulfonyl, tosyl, or mesyl halide to obtain the corresponlding alkyl 2,3-di-O-benzyl-5-deoxy-5-alkyl(or aryl)sulfonyloxyarabinofuranoside (VI). This reaction takes place at a temperature within the range of −30° C. to +40° C. for several hours.

The alkyl 2,3-O-benzyl-5-deoxy-5-phthalimido-arabinofuranoside (VII) is then obtained by reacting the 2,3 - di-O-benzyl-5-deoxy-5-alkyl(or aryl)sulfonyloxyarabinofuranoside with an alkali metal phthalimide, preferably in the presence of alkali metal iodide. This reaction takes place under anhydrous conditions, in a solvent such as dimethyl sulfoxide, dimethylformamide, acetonitrile, or an alkanol such as ethanol or butanol at a temperature of from 80° to about 160° C. depending on the solvent employed.

The 2,3-di-O-benzyl-5-deoxy-5-phthalimidoarabinofuranosyl halide (VIII) is prepared from the alkyl 2,3-di-O-benzyl-5-deoxy-5-phthalimidoarabinofuranoside by reaction in glacial acetic acid with hydrogen halide, preferably in the presence of the corresponding acetyl halide. The reaction temperature is maintained at 0° up to 65° C.

The novel purine nucleosides are the α and β isomers of the nucleosides represented by Formula A:

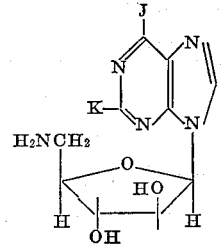

wherein:

J and K may be the same or different, hydrogen, halogen, hydroxy, mercapto, lower-alkyl mercapto, amino, lower-alkyl substituted amino group, benzylamino, or benzylmercapto.

Representative of the novel purine nucleoside compounds of the present invention, but not limited to these compounds, are:

9-(5-amino-5-deoxyarabinofuranosyl)purine
9-(5-amino-5-deoxyarabinofuranosyl)-2-aminopurine
9-(5-amino-5-deoxyarabinofuranosyl)-6-aminopurine
9-(5-amino-5-deoxyarabinofuranosyl)-2,6-diaminopurine
9-(5-amino-5-deoxyarabinofuranosyl)-2-methylaminopurine
9-(5-amino-5-deoxyarabinofuranosyl)-6-methylaminopurine
9-(5-amino-5-deoxyarabinofuranosyl)-2,6-dimethylaminopurine
9-(5-amino-5-deoxyarabinofuranosyl)-6-ethylaminopurine
9-(5-amino-5-deoxyarabinofuranosyl)-6-benzylaminopurine
9-(5-amino-5-deoxyarabinofuranosyl)-6-benzylmercaptopurine
9-(5-amino-5-deoxyarabinofuranosyl)-2-hydroxypurine
9-(5-amino-5-deoxyarabinofuranosyl)-2-amino-6-hydroxypurine
9-(5-amino-5-deoxyarabinofuranosyl)-2-hydroxy-6-aminopurine
9-(5-amino-51deoxyarabinofuranosyl)-2-methylamino-6-hydroxypurine
9-(5-amino-5-deoxyarabinofuranosyl)-2-dimethylaminopurine
9-(5-amino-5-deoxyarabinofuranosyl)-6-dimethylaminopurine
9-(5-amino-5-deoxyarabinofuranosyl)-2-mercaptopurine
9-(5-amino-5-deoxyarabinofuranosyl)-6-mercaptopurine
9-(5-amino-5-deoxyarabinofuranosyl)-2,6-dimercaptopurine
9-(5-amino-5-deoxyarabinofuranosyl)-2,6-dichloropurine
9-(5-amino-5-deoxyarabinofuranosyl)-2-chloropurine
9-(5-amino-5-deoxyarabinofuranosyl)-2-bromopurine
9-(5-amino-5-deoxyarabinofuranosyl)-6-bromopurine
9-(5-amino-5-deoxyarabinofuranosyl)-6-chloropurine
9-(5-amino-5-deoxyarabinofuranosyl)-6-methylmercaptopurine
9-(5-amino-5-deoxyarabinofuranosyl)-6-amino-2-fluoropurine
9-(5-amino-5-deoxyarabinofuranosyl)-6-(2-isopentenylyamino)-purine, and the like.

The above 2-, 6- or 2,6-substituted purine nucleosides are prepared according to Flow Sheet II.

Flow Sheet II

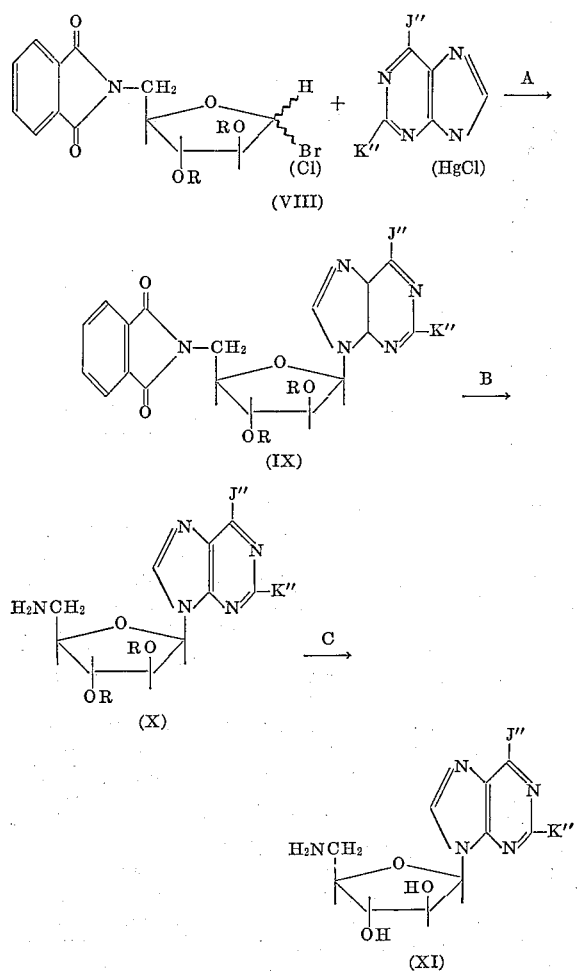

In Flow Sheet II R is an aralkyl group such as benzyl, or (substituted-phenyl)methyl, for example, nitrophenylmethyl, chlorophenylmethyl or alkoxyphenylmethyl; and J" and K" are the same or different hydrogen, halogen, hydroxy, lower acylamino, or acyl-lower-alkyl-substituted-amino groups.

According to the process of Flow Sheet II, a 2,3-di-O-aralkyl - 5 - deoxy-5-phthalimidorarabinofuranosyl halide (VIII) is reacted with a 2,6-substituted purine, or a halomercuri detrivative thereof, to obtain the 2,6-substituted-9 - (2,3 - di - O - aralkyl-5-deoxy-5-phthalimidoarabinofuranosyl)purine (IX). This reaction takes place at ambient temperatures, preferably using molecular sieves, and methylene chloride as a solvent. Under these conditions, the reaction takes place in 2–8 days. Using the mercuri halide derivative of the purine a higher temperature is preferred.

The reaction proceeds essentially stoichiometrically at a temperature range of about 25° C. to about 150° C., and preferably between about 100° C. and 140° C. In this step, the reaction is carried out in an appropriate solvent. The selection of the solvent is not important so long as it is an inert solvent and boils in a range of about 25° C. to 150° C. Examples of such solvents are toluene, xylene, benzene, dibutyl ether, cyclohexane, and the like. The preferred solvents are toluene and xylene. The reaction is normally complete in about 15 minutes to abut 5 hours, depending on the reaction temperature and the nature of the reactants.

The 2,6-substituted-9-(2,3-O-benzyl-5-deoxy-5-phthalimidoarabinofuranosyl)purine is then dissolved in a solvent, such as an alkanol and treated with hydrazine hydrate. The mixture is then heated at a temperature range of from about 50° to 100° C. for about 10 to 30 minutes to convert the 5-phthalimido-group to a 5-amino-group. In this reaction any acylamino group present at the 2 or 6-position will be likewise converted to amino.

After obtaining the intermediate reaction product (IX), the compounds are then further treated as described below, as necessary to obtain the desired 2,6-substituents in the purine portion of the nucleoside.

In the case of aminolysis, for example, to convert a 6-halo-substituent to a 6-amino-substituent, the reaction is carried out in the presence of ammonia, a monoalkyl or a dialkylamine at a temperature range of from about 25° C. to about 150° C., and preferably about 85° C. to about 110° C. for a reaction time of from about 15 minutes to about 5 hours. Examples of amines are methylamine, dimethylamine, ethylamine, diethylamine, propylamine and dipropylamine. Reactions with ammonia, or with a lower boiling amine such as methyl amine, are carried out in a sealed reaction vessel to prevent loss of the volatile reagent at the temperatures indicated. In these reactions, the 5-phthalimido group is converted to 5-amino.

In the case of mercaptolysis, for example, of a 6-halo-substituent, the reaction is carried out in the presence of thiourea or a metal salt of hydrogen sulfide or of an alkylmercaptan or aralkylmercaptan at a temperature range of from about 25° C. to about 150° C., preferably about 65° C. to about 90° C., and a reaction time of from about 15 minutes to about 5 hours. Examples of the alkali or alkaline earth metal salts of alkyl or aralkyl mercaptans are sodium methyl mercaptan, sodium ethyl mercaptan, sodium isopropyl mercaptan, sodium benzyl mercaptan, potassium methyl mercaptan and calcium methyl mercaptan.

The compound where both K and L are hydrogen, is obtained from the 9-(2,3-di-O-benzyl-5-deoxy-5-phthalimido-β-D-arabinofuranosyl)-6-halopurine by hydrogenation in the presence of a palladium catalyst at a temperature of from room temperature up to about 80° C. The temperature is not critical, although a slightly elevated temperature is preferred. The hydrogenation is carried out in the presence of an inert solvent such as methanol, ethanol, dioxane, and the like. Such treatment removes a chloro or bromo atom at the 6-position. This treatment may also remove the 2,3-di-O-benzyl groups.

The 2,3-di-O-benzyl groups of compound (IX) are removed by treatment with soidum in liquid ammonia to afford the corresponding 9-(5-amino-5-deoxy-arabinofuranosyl)-purine (X).

The novel 1 - (5 - amino-5-deoxyarabinofuranosyl)-2(1H)-pyrimidinone nucleosides are the α and β isomers of the nucleosides represented by Formula B:

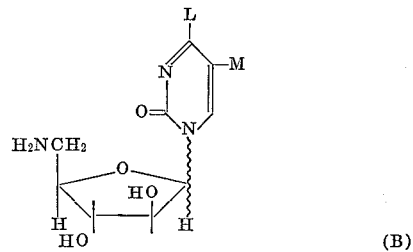

wherein:

L is lower alkoxy, hydroxy, amino, or lower-alkyl-substituted-amino; and

M is hydrogen, lower alkyl, halogen, halogenated lower alkyl, amino, lower-alkyl-substituted-amino, aralkylamino, mercapto, lower-alkylmercapto, or aralkylmercapto.

Typical lower alkoxy radicals are methoxy, ethoxy or propoxy; representative lower-alkyl substituted amino groups are methylamino, dimethylamino, ethylamino, diethylamino, propylamino, dipropylamino; alkyl mercapto groups include methyl mercapto and ethyl mercapto and the like; typical lower alkyl radicals are methyl, ethyl and propyl; the halogen substituents include chlorine, bromine, iodine or fluorine; representative aralkyl groups are benzyl, nitrobenzyl or chlorobenzyl.

Representative of the novel compounds obtained by the method of the present invention, but not limited to these compounds, are the α and β forms of:

1-(5'-amino-5'-deoxy-β-D-arabinofuranosyl)-5-fluorocytosine,
1-(5'-amino-5'-deoxy-β-D-arabinofuranosyl)-5-bromocytosine,
1-(5'-amino-5'-deoxy-β-D-arabinofuranosyl)-5-chlorocytosine,
1-(5'-amino-5'-deoxy-β-D-arabinofuranosyl)-5-trifluoromethylcytosine,
1-(5'-amino-5'-deoxy-β-D-arabinofuranosyl)-5-methylcytosine,
1-(5'-amino-5'-deoxy-β-D-arabinofuranosyl)-5-aminocytosine,
1-(5'-amino-5'-deoxy-β-D-arabinofuranosyl)-5-methylaminocytosine,
1-(5'-amino-5'-deoxy-β-D-arabinofuranosyl)-5-ethylaminocytosine,
1-(5'-amino-5'-deoxy-β-D-arabinofuranosyl)-5-propylaminocytosine,
1-(5'-amino-5'-deoxy-β-D-arabinofuranosyl)-5-dimethylaminocytosine,
1-(5'-amino-5'-deoxy-β-D-arabinofuranosyl)-5-mercaptocytosine,
1-(5'-amino-5'-deoxy-β-D-arabinofuranosyl)-5-methylmercaptocytosine,
1-(5'-amino-5'-deoxy-β-D-arabinofuranosyl)-5-ethylmercaptocytosine,
1-(5'-amino-5'-deoxy-β-D-arabinofuranosyl)-5-fluorouracil,
1-(5'-amino-5'-deoxy-β-D-arabinofuranosyl)-5-bromouracil,
1-(5'-amino-5'-deoxy-β-D-arabinofuranosyl)-5-chlorouracil,
1-(5'-amino-5'-deoxy-β-D-arabinofuranosyl)-5-trifluoromethyluracil,
1-(5'-amino-5'-deoxy-β-D-arabinofuranosyl)-5-methyluracil,
1-(5'-amino-5'-deoxy-β-D-arabinofuranosyl)-5-aminouracil,
1-(5'-amino-5'-deoxy-β-D-arabinofuranosyl)-5-methylaminouracil,
1-(5'-amino-5'-deoxy-β-D-arabinofuranosyl)-5-ethylaminouracil,
1-(5'-amino-5'-deoxy-β-D-arabinofuranosyl)-5-propylaminouracil,
1-(5'-amino-5'-deoxy-β-D-arabinofuranosyl)-5-dimethylaminouracil,
1-(5'-amino-5'-deoxy-β-D-arabinofuranosyl)-5-mercaptouracil,
1-(5'-amino-5'-deoxy-β-D-arabinofuranosyl)-5-methylmercaptouracil,
1-(5'-amino-5'-deoxy-β-D-arabinofuranosyl)-5-ethylmercaptouracil.

This procedure is ilustrated in Flow Sheet III where R" is lower alkoxy, L' is amino, substituted amino or hydroxy and M' is fluoro, trifluoromethyl or alkyl.

Flow Sheet III

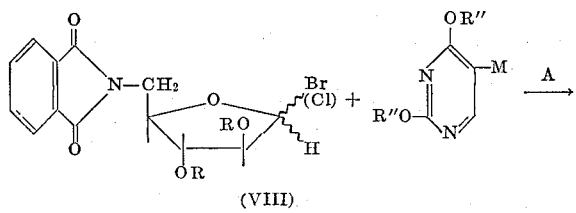

(VIII)

Flow sheet III—Continued

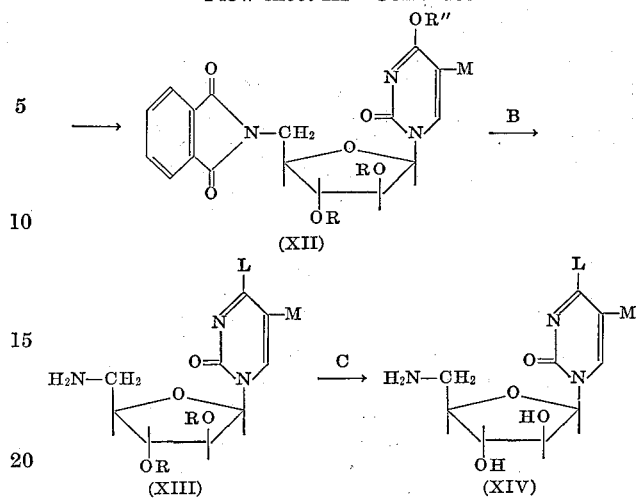

Both α and β-anomers of the compounds of the present invention are prepared by reacting in Step A a 2,4-dialkoxypyrimidine with 2,3-di-O-benzyl-5-deoxy-5-phthalimido-β-D-arabinofuranosyl halide (VIII) to form a 1-(2,3-di-O-benzyl-5-deoxy-5-phthalimido-β-D-arabinofuranosyl)-4-alkoxy-2(1H)-pyrimidinone (XII). These intermediate compounds then may be reacted in Step B with ammonia, or a primary or secondary amine to produce compounds (XIII) where L' is amino or substituted amino; or the intermidate compounds (XII) may be hydrolyzed in Step B under basic conditions to produce compounds (XIII) where L' is hydroxy. Finally the benzyl groups at the 2',3'-positions are removed in Step C to obtain the 1-(5'-amino-5'-deoxy-D-arabinofuranosyl)-2(1)-pyrimidinone (XIV).

More specifically, the process of the present invention is illustrated in Step A by the reaction of an excess of a 2,4-dialkoxypyrimidine with a 2,3-di-O-benzyl-5-deoxy-5-phthalimido-D-arabinofuranosyl halide at a temperature range of about 5° C. to about 120° C., and preferably between about 25° C. to about 60° C., until reaction is complete. In this step, the reaction is carried out in an appropriate solvent. The selection of the solvent is not important so long as it is an inert solvent. Examples of such solvents are methylene chloride, benzene, diethyl ether, dibutyl ether, dioxane, tetrahydrofuran, cyclohexane, and the like. The preferred solvent is methylene chloride.

The reaction product from Step A, where L' is lower alkoxy, may then be reacted with ammonia, or a lower alkylamine such as methylamine, ethylamine, propylamine, or dimethylamine in Step B in an appropriate solvent at about the same temperature range as in Step A, to produce compound (XII) where L' is amino or lower-alkyl amino. The reaction product from Step A where L' is lower alkoxy may also be converted into the compound where L' is hydroxy by heating at 25°–100° C. in an alcoholic solution under basic or acidic conditions.

The 2',3'-di-O-benzyl groups are removed by hydrogenolysis, suitably at room temperature and atmospheric pressure in the presence of a palladium catalyst.

For the preparation of some of the novel compounds of the present invention, an additional step may be required. For example, the 5-halo-derivatives are obtained by halogenating the 1-(5-amino-5-deoxy-β-D-arabinofuranosyl)-uracil or cytosine by methods known in the art for halogenating 1-(β-D-ribofuranosoyl)uracil or cytosine respectively. The 5-halo-derivatives can then be converted by ammonia or an amine to the corresponding 5-amino or 5-alkyl-substituted-amino derivative, or by the alkali metal salt of a mercaptan or alkylmercaptan to the corresponding 5-mercapto or 5-alkylmercapto derivative. The procedures for replacement of the 5-halogroup of the 1-(5-amino-5-deoxy-β-D-arabinofuranosyl)-5-halouracil or cytosine by amino or mercapto groups are in general the procedures described heretofore for replacement of the 6-halo-group in the purine ring by the similar group.

The following examples illustrate methods of carrying out the present invention, but it is to be understood that they are given for purposes of illustration and not of limitation.

EXAMPLE 1

Methyl D-arabinofuranoside

D-arabinose (60 g.) is added to a mixture of 1200 ml. of anhydrous methanol and 30 g. of anhydrous calcium sulfate. The suspension is stirred and 9 ml. of concentrated sulfuric acid is added slowly. The reaction mixture is stirred in a 30° C. water bath for 6 hours. The reaction mixture is tested with Fehlings solution for complete loss of reducing power. The solution is filtered and the filtrate is put onto a column of 300 ml. of Dowex 3 anion exchange resin. The column is washed with 800 ml. of methanol. The combined solution plus wash is taken down under vacuum to an oil. Pyridine (50 ml.) is added to the oil and the solution again taken down under vacuum to afford 65 g. of an oil (yield approximately 100%).

EXAMPLE 2

Methyl 5-deoxy-5-O-tritylarabinofuranoside

Methyl arabinofuranoside (pyridine containing) (39 g.), as prepared in Example 1, is dissolved in 300 ml. of pyridine, and 66 g. of triphenylchloromethane (trityl chloride) is added. The mixture is stirred until all the trityl chloride is in solution. The solution is then allowed to stand at room temperature for 4 days. The solution is poured into one liter of water, and the water extracted four times with 300 ml. of methylene chloride. The organic layer is washed with ice cold water, ice cold 1 N sulfuric acid to pH 6, then with ice cold sodium bicarbonate, and finally to pH 7 with water. The organic layer is then dried over magnesium sulfate, the magnesium sulfate filtered off, and the filtrate taken down under vacuum to an oil. The oil is triturated six times with hot n-hexane. The excess n-hexane is taken off under vacuum from the insoluble product, leaving a light brown oil (93.2 g.) which is the methyl 5-deoxy-5-O-tritylarabinofuranoside (yield 97%).

EXAMPLE 3

Methyl 2,3-di-O-benzyl-5-deoxy-5-tritylarabinofuranoside

Methyl 5-deoxy-5-tritylarabinofuranoside (28 g.) is dissolved in 133 ml. of tetrahydrofuran which contains 10 g. of anhydrous calcium sulfate. Fifty two grams of powdered caustic potash (90%) and 44.5 ml. of benzyl chloride are added very slowly with stirring. The mixture is stirred under gentle reflux overnight. The thick, sticky solution is filtered on a large filter. The filter is washed with ether and the washings added to the filtrate. The filtrate is taken down under vacuum at 90° C. to afford 52 g. of a dark oil.

EXAMPLE 4

Methyl 2,3-di-O-benzylarabinofuranoside

Methyl 2,3-di-O-benzyl-5-O-trityl - 5 - deoxyarabinofuranoside (134 g.) is dissolved in a mixture of 1230 ml. of acetic acid and 304 ml. of water. The solution is heated on a steam bath for 20 minutes, 304 ml. of water is added, and the mixture is allowed to cool. Trityl alcohol precipitates out of the cooled solution. This is filtered off and the filtrate taken down under vacuum at 80° C. to a volume of approximately 300 ml. This is diluted with about 1 liter of methylene chloride. The organic layer is washed with water, saturated sodium bicarbonate solution, and then with water to pH 7. The solution is dried over magnesium sulfate, the magnesum sulfate filtered off, and the filtrate taken down under vacuum to a dark oil.

The oil is put onto a column of silica gel and the column is eluted with methylene chloride until all the trityl alcohol is removed. The column is then eluted with a mixture of 2% methanol in methylene chloride to remove the product. The fractions are collected and taken to dryness under vacuum to afford 48 g. of an oil (yield 61%). Thin layer chromatography on silica gel in 2% methanol-methylene chloride, $R_f$ 0.4;

Analysis.—Calculated for $C_{20}H_{24}O_5$ (percent): C, 69.75; H, 7.02. Found (percent): C, 69.53; H, 7.30.

EXAMPLE 5

Methyl 2,3-di-O-benzyl-5-deoxy-5-mesylarabinofuranoside

Methyl 2,3-di-O-benzylarabinofuranoside (36 g.) is added to 60 ml. of pyridine. The mixture is cooled in an ice bath and 16.2 ml. of methanesulfonyl chloride is added. The solution is stirred in an ice bath for 45 minutes and then at room temperature for 4½ hours. The solution is mixed with 180 ml. of water and 60 ml. of methylene chloride. The layers are separated, and the organic layer is washed with 60 ml. of water, six times with 60 ml. portions of sodium bicarbonate and two times with 60 ml. portions of water. The organic layer is dried over magnesium sulfate and the magnesium sulfate is filtered off. The filtrate is taken down under vacuum leaving an oil. Toluene (50 ml.) is added and the solution again taken down under vacuum to an oil. This is repeated twice more to give 41.5 g. of product (yield 94%).

EXAMPLE 6

Methyl 2,3-di-O-benzyl-5-deoxy-5-phthalimidoarabinofuranoside

To 20 ml. of dimethyl sulfoxide containing 0.5 g. of molecular sieves is added 1 g. of methyl 2,3-di-O-benzyl-5-deoxy-5-mesylarabinofuranoside, 0.8 g. of potassium phthalimide and .05 g. of potassium iodide. The mixture is heated at 140° C. for 2½ hours and then allowed to cool overnight to room temperature.

The dimethyl sulfoxide is taken off under vacuum at 80° C. The residue is an oil containing some solid. The residue is taken up in methylene chloride and the methylene chloride solution is washed four times with water, twice with ice cold 0.25 N NaOH and then water to approximately pH 7. The methylene chloride solution is dried over magnesium sulfate, the magnesium sulfate is filtered off and the filtrate taken down under vacuum leaving an oil. The oil is then taken down to a semi-solid under high vacuum, ether is added to the semi-solid and, after scratching and cooling, crystals form. These are recrystallized from ether. Additional batches of crystals can be obtained by concentrating the ether filtrates. The oil is taken up in warm ether and cooled. Petroleum ether is added, and after cooling and scratching, crystals form. The residual oil can be put through a silica column using 5% acetone in methylene chloride. Fractions selected on the basis of thin layer chromatography data can be crystallized to yield additional product. The total yield is 0.56 g. (50%).

By fractional crystallization, the α and β anomers may be separated: α anomer, M.P. 81–83° C.; β anomer, M.P. 117–120° C.

Analysis.—(Mixture of α and β anomers) calculated for $C_{28}H_{27}O_6N$ (percent): C, 71.02; H, 5.75; N, 2.96. Found (percent): C, 70.32; H, 5.88; N, 2.70.

EXAMPLE 7

2,3-di-O-benzyl-5-deoxy-5-phthalimidoarabinofuranosylbromide

To a stirred suspension of 250 mg. of methyl 2,3-di-O-benzyl-5-deoxy-5-phthalimidoarabinofuranoside in 2 ml. of glacial acetic acid is added 0.055 ml. of acetyl bromide and 2.5 ml. of 30% hydrogen bromide in acetic acid.

After all material is dissolved, the solution is stirred for an additional 5 minutes and then taken down under vacuum to a syrup. Toluene (20 ml.) is added, and the solution again reduced to a syrup. This is repeated twice more. The syrup is taken up in 3 ml. of dry ether. The solution is then cooled in an ice bath, saturated with anhydrous hydrogen bromide, and stirred for 0.25 hours. The ether and hydrogen bromide are removed under vacuum. Toluene is added and distilled off as before, leaving 280 mg. of the syrupy product.

EXAMPLE 8

6-benzamido-9-(2,3-di-O-benzyl-5-deoxy-5-phthalimidoarabinofuranosyl)purine

A suspension of 362 mg. of finely ground chloromercuri 6-benzamidopurine in 34 ml. of xylene is dried by distilling off 15 ml. of the xylene. The stirred suspension is cooled to about 60° C. 2,3-di-O-benzyl-5-deoxy-5-phthalimidoarabinofuranosyl bromide (400 mg.) in 10 ml. of xylene is added. The mixture is stirred under reflux for 40 minutes. The hot solution is filtered, and 30 ml. of petroleum ether is added to the filtrate. The filtrate and petroleum ether mixture is cooled for 1½ hours in an ice bath. The solid which forms is filtered off and dissolved in 70 ml. of chloroform. The chloroform is washed twice with 45 ml. of a 30% (w./v.) solution of potassium iodide, twice with water, an then dried over anhydrous magnesium sulfate. The chloroform is taken down under vacuum leaving a solid foam, crude yield 440 mg. This crude material is placed on a column containing 25 g. of silica gel. The column is eluted as follows, taking 75 ml. fractions. Fraction 1 and 2–100% methylene chloride fraction 3 to 8–10% acetone in methylene chloride, fractions 9 to 16–15% acetone in methylene chloride. Fractions 13, 14 and 15 are combined to yield 170 mg. of matrial, U.V. $\lambda_{max.}^{MeOH} = 281$ m$\mu$ thin layer chromatography on silica, 15% acetone in methylene chloride, $R_f = 0.3$ to 0.4.

Similarly, 6-(N-methylbenzamido)-9-(2,3-di-O-benzyl-5-deoxy-5-phthalimidoarabinofuranosyl)purine, 2,6-dibenzamido-9-(2,3-di-O-benzyl-5-deoxy-5-phthalimidoarabinofuranosyl)purine, 2-acetamido-6-hydroxy-9-(2,3-di-O-benzyl-5-deoxy-5-phthalimidoarabinofuranosyl)purine, or 6-chloro-9-(2,3-di-O-benzyl-5-deoxy-5-phthalimidoarabinofuranosyl)purine is obtained when an equivalent amount of 6-(N-methylbenzamido)purine, 2,6-dibenzamidopurine, 2-acetamido - 6 - hydroxypurine, or 6-chloropurine is used in place of 6-benzamidopurine in the above procedure.

EXAMPLE 9

6-amino-9-(2,3-di-O-benzyl-5-amino-5-deoxyarabinofuranosyl)purine 1.25 g. of 6-benzamido-9-(2,3-di-O-benzyl-5-deoxy-5-phthalimidoarabinofuranosyl)purine is dissolved in 12 ml. of hot isopropyl alcohol. Hydrazine hydrate (0.665 ml.) is added and the solution is refluxed for 10 minutes. The solution is allowed to cool to room temperature. The white solid (phthalic dihydrazide) which precipitates out of solution is filtered off, and the filtrate is reduced in volume under vacuum.

A second batch of solid forms and is filtered off. The filtrate is again reduced in volume under vacuum. This procedure is repeated twice more. The final filtrate is taken down under vacuum leaving a syrup. The syrup is put onto a column of 40 g. of silica gel. The column is eluted with methylene chloride, collecting 10 fractions of 125 ml. each. It is then eluted with a solution of 5% methanol in methylene chloride, collecting 5 fractions of 125 ml. each. The column is next eluted with a solution of 10% mehanol in methylene chloride. The fractions with a thin layer chromatography value $R_f=0.4$ (20% methanol/methylenechloride) on silica and $\lambda_{max.}^{MeOH} = 259$ are combined. This material is dissolved in chloroform and a small amount of ether is added. After standard overnight a white solid forms in the solution. The solid is filtered off and the filtrate is taken down under vacuum leaving a syrup. The yield is 370 mg. of a product, U.V. $\lambda_{max.}^{MeOH} = 259$, $\lambda_{min.}^{MeOH} = 230$ In accordance with the above procedure, but using 6-(N-methylbenzamido)-9-(2,3-di-O-benzyl-5-deoxy-5-phthalimidoarabinofuranosyl)purine, 2,6-dibenzamido-9-(2,3-di-O-benzyl-5-deoxy-5-phthalimidoarabinofuranosyl)purine, 2-acetamido-6-hydroxy-9-(2,3-di-O-benzyl-5-deoxy-5-phthalimidoarabinofuranosyl)purine, or 6-chloro-9-(2,3-di-O-benzyl-5-deoxy-5-phthalimidoarabinofuranosyl)purine in place of the 6-benzamido-9-(2,3-di-O-benzyl-5-deoxy-5-phthalimidoarabinofuranosyl)purine in the above procedure there is obtained 6-methylamino-9-(2,3-di-O-benzyl-5-amino-5-deoxyarabinofuranosyl)purine, 2,6-diamino-9-(2,3-di-O-benzyl-5-amino-5-deoxyarabinofuranosyl)purine, 2-amino-6-hydroxy-9-(2,3-di-O-benxyl-5-amino-5-deoxyarabinofuranosyl)purine, 6-methyl-9-(2,3-di-O-benzyl-5-amino-5-deoxyarabinofuranosyl)purine, or 6-chloro-9-(2,3-di-O-benxyl-5-amino-5-deoxyarabinofuranosyl)purine, respectively.

EXAMPLE 10

6-methylamino-9-(2,3-di-O-benzyl-5-amino-5-deoxyarabinofuranosyl)purine

A mixture of 1 g. (1.6 mmoles) of 6-chloro-9-(2,3-di-O-benzyl-5-amino - 5 - deoxyarabinofuranosyl)purine, as prepared in Example 9, and 8 g. of ethylamine in 25 g. of dry methanol is heated for 10 hours at 100° C. in a sealed tube. The solution is concentrated to dryness at reduced pressure and the residue is dissolved in 50 ml. of 1:1 methanol-water. The solution is stirred for 2.5 hours with 3.5 g. of moist Dowex II–X8. The resin is removed and washed with three 15 ml. portions of water-methanol, 1:1. The filtrate and washings are concentrated to a residue containing 6-ethylamino-9-(2,3-di-O-benzyl-5-amino-5-deoxyarabinofuranosyl)purine.

In accordance with the above procedure, but replacing methylamine with dimethylamine, 6-dimethylamino-9-(2,3-di-O-benzyl-5-amino-5-deoxyarabinofuranosyl) purine is obtained.

EXAMPLE 11

9-(2,3-di-O-benzyl-5-amino-5-deoxyarabinofuranosyl)purine

A solution of 1 g. (1.6 mmoles) of 6-chloro-9-(2,3-di-O-benzyl-5-amino - 5 - deoxyarabinofuranosyl)purine, as prepared in Example 9, in 17 ml. of dioxane with 80 mg. (2.0 mmoles) of magnesium oxide and 0.5 g. of 5% palladium-on-charcoal catalyst is shaken for 98 hours in an atmosphere of hydrogen at 25° C. The mixture is filtered and concentrated by distillation at reduced pressure to a residue containing 9-(2,3-di-O-benzyl-5-amino-5- deoxyarabinofuranosyl)purine.

EXAMPLE 12

6-mercapto-9-(2,3-di-O-benzyl-5-amino-5-deoxyarabinofuranosyl)purine

A suspension of 1.25 g. (1.96 mmoles) of 6-chloro-9-(2,3-di-O-benzyl-5-amino-5-deoxyarabinofuranosyl) purine, prepared as in Example 9, and 307 mg. (4.0 mmoles) of thiourea in 3 ml. of ethanol is refluxed for 40 minutes.

The solvent is removed by vacuum distillation and the residue is partitioned between methylene chloride and water. The methylene chloride solution is then dried and the solvent removed. The crude product is chromatographed on silica gel and eluted with increasing proportions of acetone to obtain 6-mercapto-9-(2,3-di-O-benzyl-5-amino-5-deoxyarabinofuranosyl)purine.

EXAMPLE 13

6-methylthio-9-(2,3-di-O-benzyl-5-amino-5-deoxyarabinofuranosyl)purine

A boiling mixture of 605 mg. (1.9 mmoles) of 6-chloro - 9 - (2,3 - di-O-benzyl-5-amino-5-deoxyarabinofuranosyl)purine from Example 9 in 30 ml. of anhydrous methanol is treated with a solution prepared by saturating 20 ml. of 0.1 N sodium methoxide in methanol with methyl mercaptan. After being refluxed for about 30 minutes, the solution is cooled and concentrated to dryness. The solvent is removed by vacuum distillation and the residue is partitioned between methylene chloride and water. The methylene chloride solution is then dried and the solvent removed. The crude product is chromatographed on silica gel and eluted with increasing proportions of acetone to obtain 6-methylthio-9-(2,3-di-O-benzyl-5-amino-5-deoxyarabinofuranosyl)purine separates.

EXAMPLE 14

6-amino-9-(5-amino-5-deoxyarabinofuranosyl)purine (5'-amino-5'-deoxyspongoadenosine)

6 - Amino-9-(2,3-di-O-benzyl-5-amino-5-deoxyarabinofuranosyl)purine (100 mg.) is added to 20 ml. of liquid ammonia. Small pieces of sodium metal are added with stirring until a dark blue color persists. Ammonium chloride is added until the color begins to fade. The ammonia is evaporated off leaving a solid. The solid is taken up in water and the water solution shaken with benzene. After adjusting the water solution to pH 6 with dilute hydrochloric acid it is taken down under vacuum leaving 55 mg. of a solid which is 6-amino-9-(5-amino-5-deoxyarabinofuranosyl)purine dihydrochloride. Mass spectrum M $^{(+)}$ appeared at 266 (molecular weight=266.26).

Similarly,
6-methylamino-9-(5-amino-5-deoxyarbinofuranosyl)purine,
2,6-diamino-9-(5-amino-5-deoxyarabinofuranosyl)purine,
2-amino-6-hydroxy-9-(5-amino-5-deoxyarabinofuranosyl)purine,
6-ethylamino-9-(5-amino-5-deoxyarabinofuranosyl)purine,
6-dimethylamino-9-(5-amino-5-deoxyarabinofuranosyl)purine,
6-mercapto-9-(5-amino-5-deoxyarabinofuranosyl)purine,
6-methylmercapto-9-(5-amino-5-deoxyarabinofuranosyl)purine, or
9-(5-amino-5-deoxyarabinofuranosyl)purine
is obtained when an equivalent amount of
6-methylamino-9-(2,3-di-O-benzyl-5-amino-5-deoxyarabinofuranosyl)purine,
2,6-diamino-9-(2,3-di-O-benzyl-5-amino-5-deoxyarabinofuranosyl)purine,
2-amino-6-hydroxy-9-(2,3-di-O-benzyl-5-amino-5-deoxyarabinofuranosyl)purine,
6-ethylamino-9-(2,3-di-O-benzyl-5-amino-5-deoxyarabinofuranosyl)purine,
6-dimethylamino-9-(2,3-di-O-benzyl-5-amino-5-deoxyarabinofuranosyl)purine,
6-mercapto-9-(2,3-di-O-benzyl-5-amino-5-deoxyarabinofuranosyl)purine,
6-methylmercapto-9-(2,3-di-O-benzyl-5-amino-5-deoxyarabinofuranosyl)purine, or
9-(2,3-di-O-benzyl-5-amino-5-deoxyarabinofuranosyl)purine is used as starting material in the above procedure.

EXAMPLE 15

1-(2,3-di-O-benzyl-5-deoxy-5-phthalimido-$\beta$-D-arabinofuranosyl)-4-methoxy-2(1H)-pyrimidinone A mixture containing 5.0 g. of 2,3-di-O-benzyl-5-deoxy-5-phthalimido-$\beta$-D-arabinofuranosyl bromide, 4.0 g. of 2,4-dimethoxypyrimidine, 5.0 g. of molecular sieves, type 4A, 4.8 mesh, and 75 ml. of methylene chloride is protected from moisture and stirred at 25° C. for 70 hours. The mixture is filtered and concentrated under vacuum to a syrup, which is then washed twice with 20 ml. portions of hexane, and then held under reduced pressure at 35° C. for one hour. The crude product is chromatographed on a column of 400 g. of acid-washed alumina. Elution with methylene chloride containing increasing proportions of ethyl acetate results in separation of the components in the crude mixture, the desired compound being obtained in the fractions containing 12.5–20% (v./v.) of ethyl acetate. In this way 2.0 g. of the nucleoside is obtained as a pale yellow gum.

Similarly,
1-(2,3-di-O-benzyl-5-deoxy-5-phthalimido-$\beta$-D-arabinofuranosyl)-4-methoxy-5-fluoro-2(1H)-pyrimidinone,
1-(2,3-di-O-benzyl-5-deoxy-5-phthalimido-$\beta$-D-arabinofuranosyl)-4-methoxy-5-trifluoromethyl-2(1H)-pyrimidinone, or
1-(2,3-di-O-benzyl-5-deoxy-5-phthalimido-$\beta$-D-arabinofuranosyl)-4-methoxy-5-methyl-2(1H) - pyrimidinone
is obtained when an equivalent amount of
2,4-dimethoxy-5-fluoropyrimidine,
2,4-dimethoxy-5-trifluoromethylpyrimidine, or
2,4-dimethoxy-5-methylpyrimidine is used in place of the 2,4-dimethoxypyrimidine in the above procedure.

EXAMPLE 16

1-(5'-amino-5'-deoxy-2',3'-di-O-benzyl-$\beta$-D-arabinofuranosyl)cytosine

A mixture of 2.0 g. of 1-(2,3-di-O-benzyl-5-deoxy-5-phthalimido-$\beta$-D-arabinofuranosyl)-4 - methoxy - 2(1H)-pyrimidinone, 50 ml. of methanol, and 15 ml. of liquid ammonia is heated in a glass liner in a pressure bomb at 100° C. for 16 hours. After removal of ammonia and solvent by evaporation, the residual oil is triturated with methanol, and the crystalline by-product phthalamide removed by filtration. Chromatography of material from the filtrate on 50 g. of silica gel furnishes the desired compound, which is eluted by methylene chloride-methanol, 4:1 (v./v.). This product, after precipitation from ethanol with ether, is obtained as a microcrystalline powder which has the following physical properties:

$\lambda_{max.}^{MeOH}$ 273 m$\mu$, $\epsilon$, 8560 shoulder at 230 m$\mu$. Optical rotatory dispersion curve shows a positive Cotton effect at 272 m$\mu$.

$\lambda_{max.}^{Nujol}$ 2.95

3.1 (N-H, NH$_2$) 6.05, 6.15 (cytosine nucleus), 12.6, 13.65 (benzyl groups). The NMR spectrum in dimethyl sulfoxide shows doublets at 7.7 and 5.8$\gamma$ (pyrimidine protons), a doublet at 6.2 $\gamma$ (aromeric proton) a multiplet at 7.1 to 7.4$\gamma$ (aromatic protons) a complex pattern from 3.5 to 4.6$\gamma$ (benzyl methylene and 2',3' and 4' sugar protons) and a broad peak at 3$\gamma$ (5' methylene sugar protons). Integration of the spectrum gives values consistent with these assignments.

Similarly,
1-(5'-amino-5'-deoxy-2',3'-di-O-benzyl-$\beta$-D-arabinofuranosyl)-5-fluorocytosine,
1-(5'-amino-5'-deoxy-2',3'-di-O-benzyl-$\beta$-D-arabinofuranosyl)-5-trifluoromethylcytosine, or
1-(5'-amino-5'-deoxy-2',3'-di-4-benzyl-$\beta$-D-arabinofuranosyl)-5-methylcytosine is obtained when an equivalent amount of 1-(2,3-di-O-benzyl-5-deoxy-5-phthalimido-β-D-arabino-
furanosyl-5-fluoro-4-methoxy-2(1H)-pyrimidinone, 1-(2,3-di-O-benzyl-5-deoxy-5-phthalimido-β-D-arabino-
furanosyl)-5-trifluoromethyl-4-methoxy-2(1H)-
pyrimidinone, or 1-(2,3-di-O-benzyl-5-deoxy-5-phthalimido-β-D-arabino-
furanosyl)-5-methyl-4-methoxy - 2(1H) - pyrimidinone is used as starting material in the above procedure.

EXAMPLE 17

1-(5'-amino-5'-deoxy-2',3'-di-O-benzyl-β-D-
arabinofuranosyl)uracil

A mixture of 500 mg. of 1-(2,3-di-O-benzyl-5-deoxy-
5-phthalimido-β-D-arabinofuranosyl)-4-methoxy - 2(1H)-
pyrimidinone, 20 ml. of methanol and 1 ml. of 2 N
aqueous sodium hydroxide solution is heated at reflux
for one hour. The reaction mixture is concentrated to a
small volume under vacuum, the residue partitioned be-
tween water and chloroform, and the chloroform phase
washed with water. After drying, and removal of the
solvent, the residue is taken up in 25 ml. of anhydrous
methanol. The solution is then saturated at 0° C. with
ammonia, and the resulting solution heated at 100° C.
for 15 hours in a pressure bomb. The crude product
obtained after evaporation of ammonia and solvent is
chromatographed on a column of 50 g. of silica gel to
obtain pure 1-(5'-amino-5'-deoxy-2',3'-di-O-benzyl-β - D-
arabinofuranosyl)-uracil.

Similarly, 1-(5'-amino-5'-deoxy-2',3'-di-O-benzyl-β-D-arabino-
furanosyl-5-fluorouracil or 1-(5'-amino-5'-deoxy-2',3'-di-O-benzyl-β-D-arabino-
furanosyl)-5-methyluracil is obtained when an equivalent amount of 1-(2,3-di-O-benzyl-5-deoxy-5-phthalimido-β-D-ribo-
furanosyl)-5-fluoro-4-methoxy-2(1H)-pyrimidinone or 1-(2,3-di-O-benzyl-5-deoxy-5-phthalimido-β-D-ribo-
furanosyl)-5-methyl-4-methoxy-2(1H) - pyrimidinone is
used as starting material in the above procedure.

EXAMPLE 18

1-(5'-amino-5'-deoxy-β-D-arabinofuranosyl)cytosine

A suspension of 50 mg. of palladium chloride in 15
ml. of methanol is hydrogenated until conversion to pal-
ladium metal is complete. 50 mg. of 1-(5'-amino-5'-deoxy-
2',3'-di-O-benzyl-β-D-arabinofuranosyl)cytosine in 3 ml.
of methanol is added, and hydrogenolysis is carried out
at 23° C. and atmospheric pressure. After the required
amount of hydrogen has been absorbed, the mixture is
treated with Dowex 2X-8 (HCO₃—) resin to bring to
pH 5-6. The catalyst and resin are removed by filtration,
and the filtrate is concentrated under vacuum to a glassy
solid. The IR spectrum (Nujol) indicates that the product
is in the form of the bis-hydrochloride salt. The ultra-
violet spectra shows $$\lambda_{max.}^{pH-1} \; 280 \; m\mu$$

and $$\lambda_{max.}^{pH-13} \; 272$$

Similarly, 5-fluoro-1-(5'-amino-5'-deoxy-β-D-arabinofuranosyl)
cytosine, 5-trifluoromethyl-1 (5'-amino-5-deoxy-β-D-arabino-
furanosyl)cytosine, 5-methyl-1-(5'-amino-5'-deoxy-β-D-arabinofuranosyl)
cytosine, 5-fluoro-1-(5'-amino-5'-deoxy-β-D-arabinofuranosyl)
uracil, 5-trifluoromethyl-1-(5'-amino-5'-deoxy-β-D-arabino-
furanosyl)uracil, or 5-methyl-1-(5'-amino-5'-deoxy-β-D-arabinofuranosyl)
urasil is obtained when an equivalent amount of the cor-
responding 2',3'-di-O-benzyl derivative is used as the starting material.

EXAMPLE 19

5-bromo-1-(5'-amino-5'-deoxy-β-D-arabinofuranosyl)-
uracil

A solution of 100 mg. of 1-(5'-amino-5'-dexoy-β-D-
arabinofuranosyl)uracil in 1 ml. of water is treated with
an aqueous solution of bromine until a yellow color per-
sists. Excess bromine is removed by passing nitrogen
through the solution. The water is removed by breeze-
drying, and the residue is heated at reflux in 5 ml. of
ethanol for 0.5 hours. The ethanol is removed under
vacuum, leaving a residue which contains the desired
5-bromo-1-(5'-amino-5'-deoxy-β - D - arabinofuranosyl)-
uracil.

EXAMPLE 20

5-methylamino-1-(5'-amino-5'-deoxy-β-D-
arabinofuranosyl)uracil

A solution of 2 g. of 5-bromo-1-(5'-amino-5'-deoxy-
β-D-arabinofuranosyl)uracil in 20 ml. of anhydrous liquid
methylamine is heated in a sealed tube at 80° C. for 18
hours. After evaporation of the excess methylamine, the
crude product in water is added to a column of 200 ml.
of Dowex 50WX4 (H+) resin. After washing the column
with water, the column is eluted with 0.5 N ammonium
hydroxide solution. Evaporation of the ammoniacal elu-
ates furnishes 5-methylamino-1-(5'-amino-5'-deoxy-β-D-
arabinofuranosyl)uracil.

In accordance with the above procedure, but reacting
with ammonia, ethylamine or dimethylamine, the cor-
responding 5-amino-, 5-ethylamino, or 5-dimethylamino-
1-(5'-amino-5'-deoxy-β-D-arabinofuranosyl)uracil is ob-
tained.

What is claimed is:

1. (5-amino-5-deoxyarabinofuranosyl)purines, pyrimi-
dines and halides of the formula:

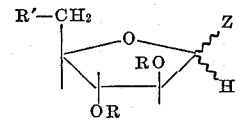

wherein:

R is hydrogen, benzyl or loweralkylbenzyl, loweralkyloxy
benzyl, halobenzyl, or nitrobenzyl, R' is amino or phthalimido, and Z is chloro, bromo, or a purine moiety of the formula

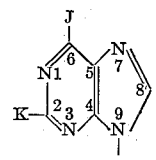

wherein:

J and K are the same or different hydrogen, halogen,
hydroxy, mercapto, loweralkyl mercapto, amino, ben-
zylamino, loweralkyl substituted amino, or benzylmer-
capto, or a pyrimidine moiety of the formula:

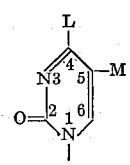

wherein:

L is loweralkoxy, hydroxy, amino or loweralkyl substi-
tuted amino,

M is hydrogen, loweralkyl, halogen, halogenated loweralkyl, mercapto, or loweralkyl mercapto, provided that when:

Z is chloro or bromo,
R is benzyl or loweralkyl benzyl, loweralkoxy benzyl, halobenzyl, or nitrobenzyl, and
R' is phthalimido.

2. The compound of claim 1 wherein R is benzyl, R' is phthalimido, and Z is chloro or bromo.

3. The compound of claim 1 wherein Z is a purine moiety having the structure

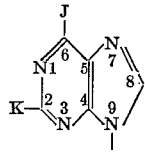

wherein:

J and K are the same or different hydrogen, halogen, hydroxy, mercapto, lower-alkylmercapto, amino, benzylamino, lower-alkyl-substituted-amino, or benzylmercapto;
R is hydrogen, and
R' is amino.

4. The compound of claim 3 where J is amino and K is hydrogen.

5. The compound of claim 3 where K is amino and J is hydroxy.

6. The compound of claim 1 wherein Z is a pyrimidine moiety of the formula

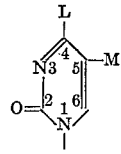

wherein:

L is lower alkoxy, hydroxy, amino or lower-alkyl-substituted-amino;
M is hydrogen, lower alkyl, halogen, halogenated lower alkyl, mercapto or lower alkylmercapto;
R is hydrogen; and
R' is amino.

7. The compound of claim 6 where L is hydroxy and M is hydrogen.

8. The compound of claim 6 where L is amino and M is hydrogen.

9. A process for preparing the compound of claim 1 where Z is chloro or bromo, R is benzyl or loweralkyl benzyl, loweralkoxy benzyl, halobenzyl, or nitrobenzyl, and R' is phthalimido, which comprises the steps of:

(A) reacting a compound having the formula:

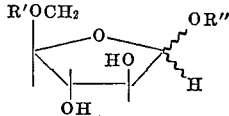

wherein:

R' is trityl; and
R'' is lower alkyl with benzyl or loweralkyl benzyl, loweralkoxy benzyl, halobenzyl, or nitrobenzyl halide in the presence of a strong base in an anhydrous inert solvent at an elevated temperature to form a compound having the formula:

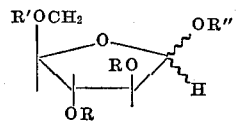

wherein R is benzyl or loweralkyl benzyl, loweralkoxy benzyl, halobenzyl, or nitrobenzyl, and R' and R'' are defined as above;

(B) treating the product of Step (A) with an aqueous solution of an organic acid to obtain a compound having the following structure:

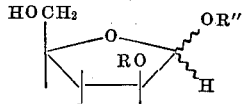

where R and R'' have the meaning above defined;

(C) reacting the product of Step (B) with an alkyl or aryl sulfonyl halide at an elevated temperature to obtain a compound having the following structure

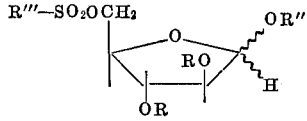

where R and R'' have the meaning above defined, and R''' is phenyl, tolyl or methyl;

(D) treating the product of Step (C) with an alkali metal phthalimide in the presence of the corresponding alkali metal iodide at an elevated temperature under anhydrous conditions in a solvent to obtain a compound having the following structure:

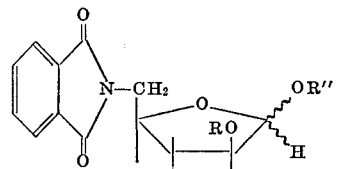

where R and R'' have the meaning above defined;

(E) treating the product of Step (D) with a hydrogen halide in glacial acetic acid to obtain a compound having the following structure:

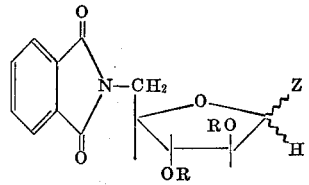

where R has the meaning above defined and Z is chloro or bromo.

10. A process for preparing the compounds of claim 3 wherein a 2,3-di-O-benzyl-5-deoxyl-5-phthalimidoarabinofuranosyl halide is reacted with a 2,6-disubstituted-purine to give a 2,6-disubstituted-9-(2,3-di-O-benzyl-5-deoxy-5-phthalimidoarabinofuranosyl)-purine, which is then treated with hydrazine hydrate in a solvent to convert the 5-phthalimido group to a 5-amino-group, and further treated with sodium in liquid ammonia to remove the 2,3-di-O-benzyl groups.

11. A process for preparing the compounds of claim 6 wherein a 5-substituted-2,4-dialkoxypyrimidine is reacted with a 2,3-di-O-benzyl-5-deoxy-5-phthalimido-β-D-arabinofuranosyl halide to form a 1-(2,3-di-O-benzyl-5-deoxy - 5-phthalimido-β-D-arabinofuranosyl)-4-alkoxy-5-substituted-2(1H)-pyrimidinone, which is then treated with ammonia or an amine to produce the 1-(5'-amino-5'-deoxy-2',3'-O-benzyl-β-D-arabinofuranosyl) - 5-substituted-cytosine, or hydrolyzed under acidic or basic conditions to produce the 1-(5'-amino-5'-deoxy-2',3'-di-O-benzyl-β-D-arabinofuranosyl)-5-substituted-uracil; followed by hydrogenolysis of said cytosine or uracil compound to obtain the corresponding 1-(5'-amino-5'-deoxy-β-D- arabinofuranosyl)cytosine or 1-(5'-amino-5'-deoxy-β-D-arabinofuranosyl)uracil.

References Cited

UNITED STATES PATENTS

| | | | |
|---|---|---|---|
| 2,875,194 | 2/1959 | Baker et al. | 260—211 |
| 3,281,410 | 10/1966 | Peter et al. | 260—211.5 |

ELBERT L. ROBERTS, Primary Examiner

ETHEL G. LOVE, Assistant Examiner

U.S. Cl. X.R.

260—210, 211, 999